United States Patent
Perriello

(10) Patent No.: US 7,329,532 B2
(45) Date of Patent: *Feb. 12, 2008

(54) REMEDIATION OF SULFUR-CONTAINING POLLUTANTS WITH HYDROCARBON-UTILIZING BACTERIA

(75) Inventor: Felix Anthony Perriello, Norwood, MA (US)

(73) Assignee: Global BioSciences, Inc., North Attleborough, MA (US)

(*) Notice: Subject to any disclaimer, the term of this patent is extended or adjusted under 35 U.S.C. 154(b) by 801 days.

This patent is subject to a terminal disclaimer.

(21) Appl. No.: 10/205,798

(22) Filed: Jul. 26, 2002

(65) Prior Publication Data

US 2003/0044966 A1    Mar. 6, 2003

Related U.S. Application Data

(60) Provisional application No. 60/308,481, filed on Jul. 27, 2001.

(51) Int. Cl.
*C02F 3/34* (2006.01)

(52) U.S. Cl. ............ 435/262; 435/262.5; 435/268; 435/281; 435/282

(58) Field of Classification Search ............ None
See application file for complete search history.

(56) References Cited

U.S. PATENT DOCUMENTS

| | | |
|---|---|---|
| 3,145,166 A | 8/1964 | Howe et al. |
| 3,242,071 A | 3/1966 | Walker |
| 3,969,446 A | 7/1976 | Franklin, Jr. |
| 4,111,808 A | 9/1978 | Fair |
| 4,328,175 A | 5/1982 | Roeckel et al. |
| 4,454,077 A | 6/1984 | Litz |
| 4,645,603 A | 2/1987 | Frankl |
| 4,695,378 A | 9/1987 | Ackman et al. |
| RE32,562 E | 12/1987 | Litz |
| 4,789,478 A | 12/1988 | Revis et al. |
| 4,956,080 A | 9/1990 | Josefik |
| 5,061,406 A | 10/1991 | Cheng |
| 5,073,309 A | 12/1991 | Bousquet et al. |
| 5,085,809 A | 2/1992 | Stirling |
| 5,169,532 A | 12/1992 | Whitlock |
| 5,314,076 A | 5/1994 | La Place et al. |
| 5,354,688 A | 10/1994 | Francis et al. |
| 5,494,576 A | 2/1996 | Hoppe et al. |

(Continued)

OTHER PUBLICATIONS www.gtacleanaironline.ca/portal/user/anon/page/default.psml/js_peid/main/media-typ...*

*Primary Examiner*—David Redding
(74) *Attorney, Agent, or Firm*—Alan G. Towner, Esq.; Pietragallo Bosick & Gordon, LLP

(57) ABSTRACT

Methods and apparatus are disclosed for remediating sulfur-containing pollutants with a hydrocarbon that is used to stimulate the growth of hydrocarbon-utilizing bacteria. The hydrocarbon is preferably an alkane such as butane. The sulfur-containing pollutant may comprise sulfate, sulfite, sulfide, disulfides, mercaptans, alkanesulfonates, dialkyl sulfides, thiosulfate, thiofurans, thiocyanates, isothiocyanates, thioureas, thiols, thiophenols, thioethers, thiophene, tetrathionate, dithionite, dialkyl disulfides, sulfones, sulfoxides, sulfolanes, sulfonic acid, dimethylsulfoniopropionate, sulfonic esters, hydrogen sulfide, sulfate esters, sulfur dioxide and any other sour gases, elemental sulfur and any other sulfur-containing material considered to be a contaminant or pollutant.

37 Claims, 1 Drawing Sheet

U.S. PATENT DOCUMENTS

| | | |
|---|---|---|
| 5,529,693 A | 6/1996 | Yano et al. |
| 5,632,715 A | 5/1997 | Harrington et al. |
| 5,651,890 A * | 7/1997 | Trost .................... 210/603 |
| 5,660,730 A | 8/1997 | Lucchese et al. |
| 5,710,361 A | 1/1998 | Harrington et al. |
| 5,733,067 A | 3/1998 | Hunt et al. |
| 5,789,236 A | 8/1998 | Jenneman |
| 5,814,514 A * | 9/1998 | Steffan et al. .............. 435/262 |
| 5,833,855 A | 11/1998 | Saunders |
| 5,888,396 A | 3/1999 | Perriello |
| 5,916,491 A | 6/1999 | Hills |
| 5,925,290 A | 7/1999 | Hills |
| 6,051,130 A | 4/2000 | Perriello |
| 6,110,372 A | 8/2000 | Perriello |
| 6,156,203 A | 12/2000 | Perriello |
| 6,210,579 B1 | 4/2001 | Perriello |
| 6,217,766 B1 | 4/2001 | Stetter et al. |
| 6,244,346 B1 | 6/2001 | Perriello |
| 6,245,235 B1 | 6/2001 | Perriello |
| 6,287,873 B2 * | 9/2001 | Srivastava et al. .......... 435/266 |
| 6,306,302 B1 | 10/2001 | Maree et al. |
| 6,319,328 B1 | 11/2001 | Greenberg et al. |
| 6,322,700 B1 | 11/2001 | Suthersan |
| 6,361,694 B1 | 3/2002 | Trost |
| 6,488,850 B2 * | 12/2002 | Perriello .................... 210/605 |
| 6,669,846 B2 * | 12/2003 | Perriello .................... 210/610 |
| 6,835,312 B2 * | 12/2004 | Perriello et al. ............ 210/610 |
| 7,192,523 B2 * | 3/2007 | Perriello .................... 210/610 |
| 2001/0023847 A1 | 9/2001 | Perriello |
| 2002/0066566 A1 | 6/2002 | Perriello |
| 2002/0195389 A1 | 12/2002 | Perriello |
| 2003/0034301 A1 | 2/2003 | Perriello |
| 2003/0044966 A1 | 3/2003 | Perriello |
| 2003/0062306 A1 | 4/2003 | Perriello |
| 2003/0066322 A1 | 4/2003 | Perriello |
| 2003/0084609 A1 | 5/2003 | Perriello et al. |
| 2003/0136735 A1 | 7/2003 | Perriello |
| 2003/0167686 A1 | 9/2003 | Perriello |
| 2003/0201227 A1 | 10/2003 | Perriello |

* cited by examiner

REMEDIATION OF SULFUR-CONTAINING POLLUTANTS WITH HYDROCARBON-UTILIZING BACTERIA

CROSS-REFERENCE TO RELATED APPLICATION

This application claims the benefit of U.S. Provisional Application Ser. No. 60/308,481 filed Jul. 27, 2001, which is incorporated herein by reference.

FIELD OF THE INVENTION

The present invention relates to the remediation of sulfur-containing pollutants, and more particularly relates to a method and apparatus for bioremediation of sulfur-containing pollutants with hydrocarbon-utilizing bacteria.

BACKGROUND OF THE INVENTION

The presence of sulfur-containing pollutants in effluent or wastewater solutions and gaseous emissions creates disposal problems for many industries. For example, problems with sulfate, sulfite and thiosulfate range from sewers to the eutrophication of water bodies, silting and acidification. One type of effluent in which sulfur-containing pollutants such as sulfite are present is the washwater from flue gas treatment plants. The flue gases from power stations, waste incinerators and the like create severe pollution and environmental damage due to the presence of sulfur dioxide and the associated low pH. Many industries, such as printing, mining, paper, rubber, leather and petrochemical industries produce effluent waters with high sulfur-containing pollutant concentrations.

Conventional biological treatment of sulfate, sulfite and other sulfur compounds, including effluents from gas desulfurization plants, involves reduction in an anaerobic step to produce sulfide, which in turn can be biologically oxidized to elemental sulfur. When the effluent contains little organic matter, electron donors must be added in order to provide sufficient reduction equivalents for the sulfate-reducing bacteria. Electron donors include alcohols such as methanol and ethanol, carbohydrates such as glucose and other saccharides, organic acids such as acetic, propionic, butyric and lactic acid, hydrogen and carbon monoxide.

The bioremediation of various pollutants using butane-utilizing bacteria is disclosed in U.S. Pat. Nos. 5,888,396, 6,051,130, 6,110,372, 6,156,203, 6,210,579, 6,244,346 and 6,245,235, which are incorporated herein by reference.

SUMMARY OF THE INVENTION

In accordance with the present invention, hydrocarbons are used to remediate sulfur-containing pollutants, such as solutions containing sulfur compounds. The hydrocarbons are introduced into the solution to stimulate the growth of hydrocarbon-utilizing bacteria, which remediate the sulfur-containing pollutant, e.g., by reducing sulfite and sulfate to sulfide under anaerobic conditions, then oxidizing the sulfide to elemental sulfur under aerobic conditions.

Hydrocarbons are used in accordance with the present invention to stimulate the growth of hydrocarbon-utilizing bacteria. The hydrocarbon may comprise an alkane such as butane, or may comprise other types of hydrocarbons. In one embodiment, the hydrocarbon acts as a water-soluble electron acceptor. Improved reduction of sulfur-containing pollutants can be achieved by stimulating a variety of organisms capable of reducing the compounds of interest. Rather than relying on the reducing capabilities of a single bacterial isolate, competition may be shifted toward a wide variety of organisms including bacteria, protozoa, algae, fungi and other microorganisms if a highly available or soluble hydrocarbon food substrate is available during a growth phase of the organisms. The addition or presence of a soluble hydrocarbon source such as butane affects the bacterial diversity in an ecosystem, thereby increasing the ability of an ecosystem to reduce targeted sulfur-containing pollutants.

In one embodiment of the invention, a hydrocarbon such as butane is used to drive a treatment process anaerobic thereby encouraging the growth of anaerobic microorganisms capable of reducing sulfur-containing compounds. Under anaerobic conditions, sulfate and elemental sulfur may serve as electron acceptors while the hydrocarbon substrate is oxidized. The anaerobic processes may include desulfurization, sulfur respiration or dissimilatory sulfate reduction.

An aspect of the present invention is to provide a method of remediating a sulfur-containing pollutant. The method comprises introducing a hydrocarbon to the sulfur-containing pollutant to stimulate growth of hydrocarbon-utilizing bacteria.

Another aspect of the present invention is to provide a system for remediating a sulfur-containing pollutant. The system includes means for treating the sulfur-containing pollutant with hydrocarbon-utilizing bacteria in the presence of a hydrocarbon.

A further aspect of the present invention is to provide a system for remediating a sulfur-containing pollutant. The system includes a source of hydrocarbon and a hydrocarbon injection system in communication with the hydrocarbon source and the sulfur-containing pollutant. The system may further include means for collecting the treated sulfur-containing pollutants.

These and other aspects of the present invention will be more apparent from the following description.

DETAILED DESCRIPTION

Figure 1:
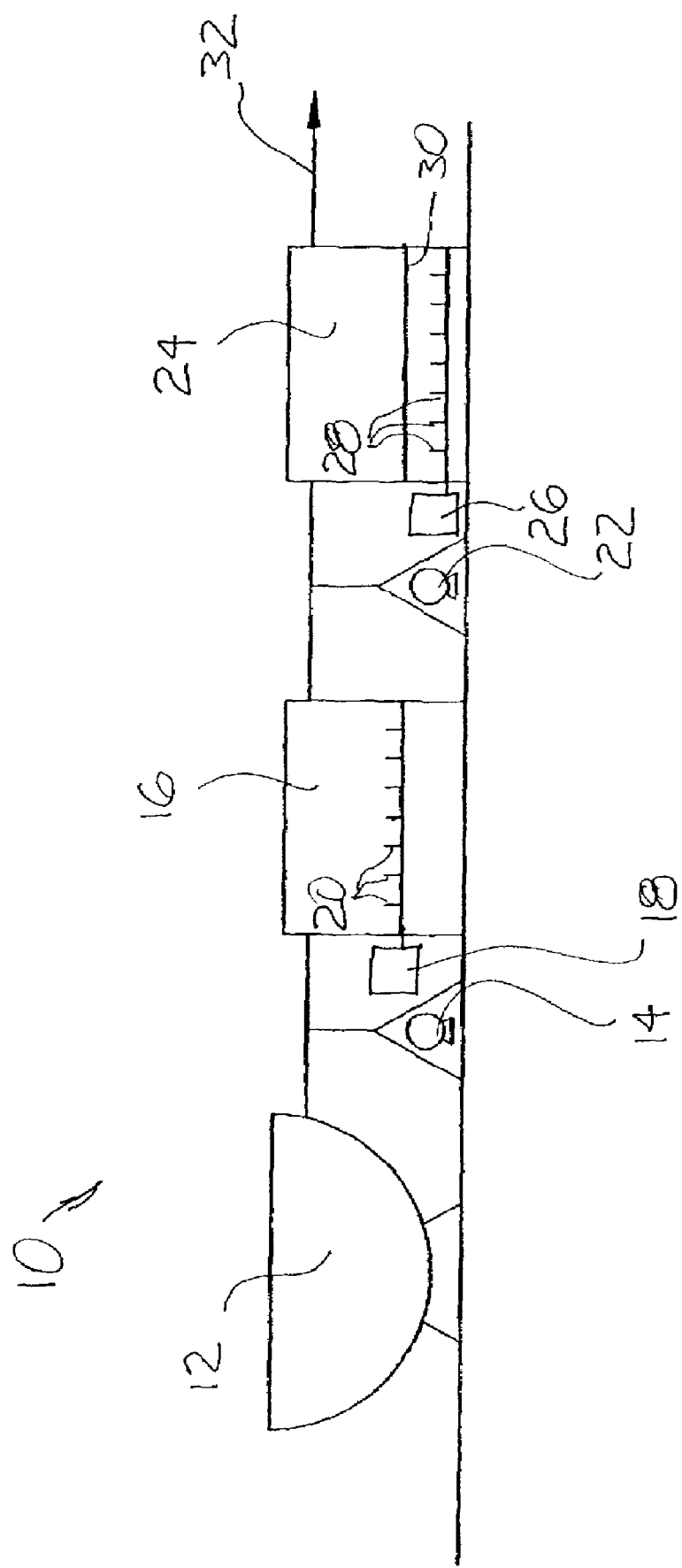
FIG. 1 illustrates a system which uses hydrocarbon-utilizing bacteria for the anaerobic/aerobic remediation of a sulfur-containing pollutant in accordance with an embodiment of the present invention.

In accordance with the present invention, aerobic and/or anaerobic hydrocarbon-utilizing bacteria are used to treat sulfur-containing pollutants such as solutions containing sulfur compounds. As used herein, the term "sulfur-containing pollutant" includes sulfate, sulfite, sulfide, disulfides, mercaptans, alkanesulfonates, dialkyl sulfides, thiosulfate, thiofurans, thiocyanates, isothiocyanates, thioureas, thiols, thiophenols, thioethers, thiophene, tetrathionate, dithionite, dialkyl disulfides, sulfones, sulfoxides, sulfolanes, sulfonic acid, dimethylsulfoniopropionate, sulfonic esters, hydrogen sulfide, carbon disulfide, sulfate esters, sulfur dioxide and other sour gases, elemental sulfur and any other sulfur-containing material considered to be a contaminant or pollutant. The sulfur-containing pollutant may be present in liquids, solids or gases. For example, the pollutant may be present in an aqueous solution such as groundwater, surface water, wastewater or the like. The sulfur-containing pollutant may also be present in soil and other industrial effluents and gaseous emissions.

In one embodiment, the sulfur-containing pollutant may comprise a sulfur compound that is converted to another sulfur compound during the treatment process. Alternatively, the sulfur-containing pollutant may be converted to elemental sulfur during the treatment process. In another embodiment, the sulfur-containing pollutant may comprise elemental sulfur that is separated during the treatment process by precipitation, sedimentation, oxidation or the like.

In accordance with the present invention, at least one hydrocarbon is introduced to the sulfur-containing pollutant to stimulate the growth of hydrocarbon-utilizing bacteria. The hydrocarbon may comprise one or more alkanes, alkenes, alkynes, poly(alkene)s, poly(alkyne)s, aromatic hydrocarbons, aromatic hydrocarbon polymers or aliphatic hydrocarbons. The hydrocarbon is preferably an alkane, such as methane, ethane, propane and/or butane.

Butane is a preferred hydrocarbon due to its high solubility and relatively low molecular weight. Furthermore, butane is non-toxic and may serve as an electron donor under anaerobic conditions. In one embodiment, butane is the most prevalent compound of the hydrocarbon substrate on a weight percent basis, and may comprise at least about 10 weight percent of the hydrocarbon substrate. The other constituents of the hydrocarbon substrate may include other hydrocarbons, e.g., other alkanes. The hydrocarbon substrate may also include inert gases such as nitrogen, helium or argon. In one embodiment, the hydrocarbon substrate comprises at least about 50 weight percent butane. For example, the hydrocarbon substrate may comprise at least about 90 weight percent butane. In a particular embodiment, the hydrocarbon substrate comprises at least about 99 weight percent n-butane. The butane may contain straight (n-butane) and/or branched chained compounds such as isobutane.

Oxygen may be introduced during some or all of the treatment time, e.g., to provide aerobic conditions. When oxygen is introduced, it may be injected continuously or intermittently to the treatment zone. The oxygen may be supplied in the form of air, substantially pure oxygen or the like.

Treatment processes that may be used in accordance with the present invention include the use of hydrocarbon-utilizing microorganisms which may be found naturally, e.g., in water, groundwater, wastewater, effluent, soil and the like. However, in some applications it may be necessary to inoculate bacteria into the treatment zone. Suitable bacteria may include the following Groups (in addition to fungi, algae, protozoa, rotifers and other aerobic and anaerobic microbial populations found in decaying materials):

| Group 1: | The Spirochetes |
|---|---|
| Group 2: | Aerobic/Microaerophilic, motile, helical/vibroid, gram-negative bacteria |
| Group 3: | Nonmotile (or rarely motile), gram-negative bacteria |
| Group 4: | Gram-negative aerobic/microaerophilic rods and cocci |
| Group 5: | Facultatively anaerobic gram-negative rods |
| Group 6: | Gram-negative, anaerobic, straight, curved, and helical bacteria |
| Group 7: | Dissimilatory sulfate- or sulfur-reducing bacteria |
| Group 8: | Anaerobic gram-negative cocci |
| Group 10: | Anoxygenic phototrophic bacteria |
| Group 11: | Oxygenic phototrophic bacteria |
| Group 12: | Aerobic chemolithotrophic bacteria and associated organisms |
| Group 13: | Budding and/or appendaged bacteria |
| Group 14: | Sheathed bacteria |
| Group 15: | Nonphotosynthetic, nonfruiting gliding bacteria |

-continued

| Group 16: | The fruiting, gliding bacteria and the Myxobacteria |
|---|---|
| Group 17: | Gram-positive cocci |
| Group 18: | Endospore-forming gram-positive rods and cocci |
| Group 19: | Regular, nonsporing, gram-positive rods |
| Group 20: | Irregular, nonsporing, gram-positive rods |
| Group 21: | The mycobacteria |
| Groups 22-29: | The actinomycetes |
| Group 22: | Nocardioform actinomycetes |
| Group 23: | Genera with multiocular sporangia |
| Group 24: | Actinoplanetes |
| Group 25: | Streptomycetes and related genera |
| Group 26: | Maduromycetes |
| Group 27: | Thermomonospora and related genera |
| Group 28: | Thermoactinomycetes |
| Group 29: | Genus Glycomyces, Genus Kitasatospira and Genus Saccharothrix |
| Group 30: | The Mycoplasmas-cell wall-less bacteria |
| Group 31: | The Methanogens |
| Group 32: | Archaeal sulfate reducers |
| Group 33: | Extremely halophilic, archaeobacteria (halobacteria) |
| Group 34: | Cell wall-less archaeobacteria |
| Group 35: | Extremely thermophilic and hyperthermophilic $S^0$-metabolizers. |

In addition, suitable bacteria may include facultative anaerobes and/or microaerophilic anaerobes, which are capable of surviving at low levels of oxygen. These bacteria do not require strict anaerobic conditions such as the obligate anaerobes. Acidophilic, alkaliphilic, anaerobe, anoxygenic, autotrophic, chemolithotrophic, chemoorganotroph, chemotroph, halophilic, methanogenic, neutrophilic, phototroph, saprophytic, thermoacidophilic, and thermophilic bacteria may be used. Hydrocarbon injection and combined hydrocarbon/oxygen injection may encourage the growth of other microorganisms such as fungi, protozoa and algae that may be beneficial to the sulfur-containing pollutant remediation process.

Hydrocarbon addition to an anaerobic system containing alternate electron acceptors such as sulfate may enhance the reduction of sulfur compounds. Anaerobically, hydrocarbons such as butane may serve as electron donors for direct metabolic, sequential metabolic, reductive metabolic or cometabolic processes.

Additionally, the activity of butane-utilizing bacteria (under aerobic conditions) through direct metabolic, sequential metabolic, reductive metabolic or cometabolic processes may enhance the oxidation of sulfide, sulfur and thiosulfate through the production of operative enzymes that function in a similar fashion to sulfide oxidase enzymes, sulfur-oxidizing enzymes, sulfite oxidase, thiosulfate-cleaving enzymes, sulfur transferase enzymes, thiosulfate-oxidizing enzymes or any other sulfur oxidizing enzymes.

FIG. 1 is a partially schematic illustration of a sulfur-containing pollutant treatment system 10 in accordance with an embodiment of the present invention. A sulfur-containing pollutant 12 is pumped 14 to an anaerobic chamber 16. The sulfur-containing pollutant may comprise, for example, effluent containing sulfur compounds such as sulphate, sulphite and thiosulphate. A hydrocarbon source 18 such as a butane cylinder communicates with hydrocarbon injectors or diffusers 20 located in the anaerobic chamber 16.

After treatment in the anaerobic chamber 16, the material is pumped 22 to an aerobic chamber 24. A hydrocarbon and oxygen source 26 communicates with injectors or diffusers 28 in the aerobic chamber 24. A collection tray 30, or other suitable deposition material such as a membrane lining, is used to deposit treated material. For example, sulfide may be oxidized to elemental sulfur in the aerobic chamber 24 and deposited as elemental sulfur on the collection tray 30. Treated material 32, e.g., clean water, exits the aerobic chamber 24. The system 10 may be operated in a continuous mode, or in a batch process.

As shown in FIG. 1, hydrocarbon-utilizing bacteria in the anaerobic reduction chamber 16 convert or remove sulfur compounds from the solution, e.g., by reducing sulfite and/or sulfate to sulfide. In the second reactor 24, hydrocarbon-utilizing bacteria convert the sulfide to elemental sulfur by oxidizing the sulfide under aerobic conditions. The aerobic conditions may be achieved through the addition of air, substantially pure oxygen or any other suitable oxygen source. Alternatively, a hydrocarbon may be used without air or oxygen.

In addition to the system shown in FIG. 1, other types of ex-situ systems may be used in accordance with the present invention. For example, ex-situ bioreactors as disclosed in U.S. Pat. Nos. 5,888,396 and 6,051,130 may be used to treat sulfur-containing pollutants either anaerobically or aerobically. Furthermore, although an ex-situ treatment system is shown in FIG. 1, in-situ techniques, such as those described in U.S. Pat. No. 6,245,235, may be used in accordance with the present invention to remediate sulfur-containing pollutants in surface water, groundwater, soil and the like.

Whereas particular embodiments of this invention have been described above for purposes of illustration, it will be evident to those skilled in the art that numerous variations of the details of the present invention may be made without departing from the invention.

What is claimed is:

1. A method of remediating a sulfur-containing pollutant, the method comprising introducing a hydrocarbon to the sulfur-containing pollutant to stimulate growth of hydrocarbon-utilizing bacteria and introducing oxygen to the hydrocarbon-utilizing bacteria continuously or intermittently, wherein the hydrocarbon comprises butane, ethane and/or propane.

2. The method of claim 1, wherein the hydrocarbon comprises butane.

3. The method of claim 2, wherein the butane is provided as a butane substrate comprising butane as the most prevalent compound of the substrate.

4. The method of claim 2, wherein the butane is provided as a butane substrate comprising at least about 10 weight percent butane.

5. The method of claim 2, wherein the butane is provided as a butane substrate comprising at least about 50 weight percent butane.

6. The method of claim 2, wherein the butane is provided as a butane substrate comprising at least about 90 weight percent butane.

7. The method of claim 2, wherein the butane is provided as a butane substrate comprising at least about 99 weight percent n-butane.

8. The method of claim 1, wherein the hydrocarbon comprises ethane.

9. The method of claim 1, wherein the hydrocarbon comprises propane.

10. The method of claim 1, wherein the hydrocarbon is introduced to the hydrocarbon-utilizing bacteria intermittently.

11. The method of claim 1, wherein the hydrocarbon-utilizing bacteria comprise at least one bacterium selected from the group consisting of acidophilic, alkaliphilic, anaerobe, anoxygenic, autotrophic, chemolithotrophic, chemoorganotroph, chemotroph, halophilic, methanogenic, neutrophilic, phototroph, saprophytic, thermoacidophilic and thermophilic bacteria.

12. The method of claim 1, wherein the hydrocarbon-utilizing bacteria comprise aerobic bacteria, anaerobic bacteria, facultative anaerobes and/or microaerophilic anaerobes.

13. The method of claim 1, wherein the hydrocarbon-utilizing bacteria comprise aerobic bacteria.

14. The method of claim 1, wherein the hydrocarbon-utilizing bacteria comprise anaerobic bacteria.

15. The method of claim 1, wherein the hydrocarbon-utilizing bacteria comprise facultative anaerobes and/or microaerophilic anaerobes.

16. The method of claim 1, wherein the hydrocarbon-utilizing bacteria comprise at least one bacterium selected from the group consisting of *Pseudomonas, Variovorax, Nocardia, Chryseobacterium, Comamonas, Acidovorax, Rhodococcus, Aureobacterium, Micrococcus, Aeromonas, Stenotrophomonas, Sphingobacterium, Shewanella, Phyllobacterium, Clavibacter, Alcaligenes, Gordona, Corynebacterium* and *Cytophaga*.

17. The method of claim 1, wherein the hydrocarbon-utilizing bacteria comprise at least one bacterium selected from the group consisting of *putida, rubrisubalbicans, aeruginosa, paradoxus, asteroides, brasiliensis, restricta, globerula, indologenes, meningosepticum, acidovorans, delafieldii, rhodochrous, erythropolis, fascians, barkeri, esteroaromaticum, saperdae, varians, kristinae, caviae, maltophilia, thalpophilum, spiritivorum, putrefaciens B, myrsinacearum, michiganense, xylosoxydans, terrae, aquaticum B* and *johnsonae*.

18. The method of claim 1, wherein the sulfur-containing pollutant comprises sulfate, sulfite, sulfide, disulfides, mercaptans, alkanesulfonates, dialkyl sulfides, thiosulfate, thiofurans, thiocyanates, isothiocyanates, thioureas, thiols, thiophenols, thioethers, thiophene, tetrathionate, dithionite, dialkyl disulfides, sulfones, sulfoxides, sulfolanes, sulfonic acid, dimethylsulfoniopropionate, sulfonic esters, hydrogen sulfide, sulfate esters, sulfur dioxide and/or elemental sulfur.

19. The method of claim 1, wherein the sulfur-containing pollutant comprises a sulfur compound which is converted to another sulfur compound during the remediation process.

20. The method of claim 1, wherein the sulfur-containing pollutant comprises a sulfur compound which is converted to elemental sulfur during the remediation process.

21. The method of claim 1, wherein the sulfur-containing pollutant comprises elemental sulfur which is separated from a solution containing the pollutant during the remediation process.

22. The method of claim 1, wherein the sulfur-containing pollutant is present in a solution.

23. The method of claim 22, wherein the solution comprises water, groundwater, surface water or wastewater.

24. The method of claim 1, wherein the oxygen is provided in the form of air.

25. The method of claim 1, wherein the oxygen is provided in the form of substantially pure oxygen.

26. The method of claim 1, wherein the oxygen is provided to the hydrocarbon-utilizing bacteria continuously.

27. The method of claim 1, wherein the oxygen is provided to the hydrocarbon-utilizing bacteria intermittently.

28. The method of claim 1, wherein the sulfur-containing pollutant comprises sulfite and the hydrocarbon-utilizing bacteria reduce the sulfite to sulfide.

29. The method of claim 1, wherein the sulfur-containing pollutant comprises sulfate and the hydrocarbon-utilizing bacteria reduce the sulfate to sulfide.

30. The method of claim 1, wherein the sulfur-containing pollutant comprises sulfide and the hydrocarbon-utilizing bacteria oxidize the sulfide under substantially aerobic conditions to produce elemental sulfur.

31. The method of claim 1, wherein the sulfur-containing pollutant is remediated using an aerobic oxidation chamber.

32. A method of remediating a sulfur-containing pollutant, the method comprising introducing a hydrocarbon to the sulfur-containing pollutant to stimulate growth of hydrocarbon-utilizing bacteria and introducing oxygen to the hydrocarbon-utilizing bacteria continuously or intermittently, wherein the hydrocarbon comprises butane, ethane and/or propane, and the sulfur-containing pollutant is contained in water, groundwater, surface water or wastewater.

33. A method of remediating a sulfur-containing pollutant, the method comprising introducing a hydrocarbon to the sulfur-containing pollutant to stimulate growth of hydrocarbon-utilizing bacteria, wherein the hydrocarbon comprises butane, ethane and/or propane, and the hydrocarbon-utilizing bacteria comprise anaerobic bacteria.

34. The method of claim 33, wherein the hydrocarbon generates anaerobic conditions around the sulfur-containing pollutant.

35. The method of claim 33, wherein the hydrocarbon serves as an electron donor under anaerobic conditions.

36. The method of claim 33, wherein the sulfur-containing pollutant is remediated in an anaerobic reduction chamber.

37. A method of remediating a sulfur-containing pollutant, the method comprising introducing a hydrocarbon to the sulfur-containing pollutant to stimulate growth of hydrocarbon-utilizing bacteria and introducing oxygen to the hydrocarbon-utilizing bacteria continuously or intermittently, wherein the hydrocarbon comprises butane, ethane and/or propane; and the sulfur-containing pollutant comprises sulfite and the hydrocarbon-utilizing bacteria reduce the sulfite to sulfide; or the sulfur-containing pollutant comprises sulfide and the hydrocarbon-utilizing bacteria reduce the sulfide to elemental sulfur.

* * * * *

UNITED STATES PATENT AND TRADEMARK OFFICE
CERTIFICATE OF CORRECTION

PATENT NO. : 7,329,532 B2  Page 1 of 1
APPLICATION NO. : 10/205798
DATED : February 12, 2008
INVENTOR(S) : Felix Anthony Perriello It is certified that error appears in the above-identified patent and that said Letters Patent is hereby corrected as shown below:

Claim 16, Column 6, Line 22
"...bacteriurn,..." should read "...*bacterium*,..."

Column 8, Line 19
After "...sulfite to sulfide; or..." add the following:
--the sulfur-containing pollutant comprises sulfate and the hydrocarbon-utilizing bacteria reduce the sulfate to sulfide; or--

Signed and Sealed this

First Day of December, 2009

David J. Kappos
*Director of the United States Patent and Trademark Office*